United States Patent [19]

Hardt et al.

[11] Patent Number: 4,657,316

[45] Date of Patent: Apr. 14, 1987

[54] VIEWING SCREEN WITH A SWIVELING SCREEN HOUSING

[75] Inventors: Walter Hardt; Franz Werner; Norbert Bonke, all of Paderborn, Fed. Rep. of Germany

[73] Assignee: Nixdorf Computer AG, Fed. Rep. of Germany

[21] Appl. No.: 898,722

[22] Filed: Aug. 14, 1986

Related U.S. Application Data

[63] Continuation of Ser. No. 672,149, Nov. 16, 1984, abandoned.

[30] Foreign Application Priority Data

Nov. 25, 1983 [DE] Fed. Rep. of Germany ....... 3342741

[51] Int. Cl.⁴ .............................................. A47B 81/06
[52] U.S. Cl. ......................................... 312/7.2; 248/1; 358/254
[58] Field of Search .................. 312/7.2, 251, 252, 20, 312/305, 328, 327; 358/254; 248/1 H, 1 I, 185; D 14/77; 353/74, 119

[56] References Cited

U.S. PATENT DOCUMENTS

| | | | |
|---|---|---|---|
| 2,304,490 | 12/1942 | Yoder | 312/7.2 |
| 2,499,579 | 3/1950 | Fritsch | 312/7.2 |
| 2,604,536 | 7/1952 | Rose | 312/7.2 |
| 3,614,040 | 10/1971 | Martinez | 353/119 |
| 4,427,243 | 1/1984 | Miller | 312/7.2 |
| 4,561,620 | 12/1985 | Goetz et al. | 248/1 I |

FOREIGN PATENT DOCUMENTS

| | | | |
|---|---|---|---|
| 2060116 | 3/1978 | Fed. Rep. of Germany | 353/119 |
| 2940493 | 4/1981 | Fed. Rep. of Germany | 312/7.2 |

Primary Examiner—Francis K. Zugel
Assistant Examiner—Gerald A. Anderson
Attorney, Agent, or Firm—Cullen, Sloman, Cantor, Grauer, Scott & Rutherford

[57] ABSTRACT

The invention relates to a viewing screen unit (2) with a viewing screen housing (6) supported swivelably around a swivel axis (4). The viewing screen housing (6) has the shape of a circular cylinder segment, where the viewing screen plane essentially coincides with the intersecting plane (10) of the circular cylinder segment and the pivot axis (4) coincides with the cylinder axis. In a preferred embodiment, the viewing screen housing (6) is fastened swivelably onto a receiving housing (8) containing at least part of the components. The receiving housing (8) is provided with a concave recess (19) turned toward the viewing screen housing (6), which recess fits closely against the curved rear wall of the viewing screen housing. The supporting of the swivelable viewing screen housing is preferably done by supporting means which act on either the inside of the end faces or on the curved back side of the viewing screen housing (6).

7 Claims, 4 Drawing Figures

VIEWING SCREEN WITH A SWIVELING SCREEN HOUSING

This is a continuation of co-pending application Ser. No. 672,149 filed on Nov. 16, 1984, now abandoned.

TECHNICAL FIELD

The invention relates to a viewing screen unit mounted to swivel.

BACKGROUND OF THE INVENTION

Viewing screen units of this species make possible a swiveling of the viewing screen housing in order, for example, to be able to adapt the viewing screen to a different angle of view or angle of incident light. The swivel axis is generally horizontal, which means that the viewing screen can assume different tilt angles. The invention, however, basically also includes viewing screen units in which the viewing screen housing is swivelable around a vertical axis to the side.

Viewing screen units of the type of the species are being used more and more in all fields of life, for example, as data viewing screens, television sets, video screen units, video game units, etc. Therefore, it is more and more desirable to build such units into office and home furniture in a space-saving and optically attractive form.

Viewing screen units of the type of the species are already known which are fastened on a supporting frame to be swivelable around a horizontal axis. The known units are generally designed in a cube shape. A disadvantage of this type of units is that when the unit is tilted, its effective height changes, so that the height clearance to be kept free must be larger than the height of the viewing screen unit.

SUMMARY OF THE INVENTION

It is the problem of the present invention to create a viewing screen unit which can swivel, the space requirement of which does not change during swiveling, so that it can be space-saving and optically attractive when built into furniture, table top units on switch banks or the like.

In accordance with the invention, a viewing screen unit, which contains either the whole viewing screen unit or, as will later be described, essentially contains only the picture tube, has approximately the shape of a circular cylinder segment which can be swiveled around the cylinder axis. The picture screen proper is arranged in approximately the intersecting plane. Such a circular cylinder cylinder segment may be closely enclosed by a furniture housing having a cylindrically contoured peripheral design so as to overcome the disadvantage existing in conventional viewing screen unis, that troublesome and unattractive gaps remain between the viewing screen unit and the enclosing furniture housing at certain swiveling angles.

The plane of interest may basically be located at any distance from the cylindrical axis. The largest intersecting plane and thus the largest possible viewing screen surface is given when, by a preferred development of the invention, the viewing screen housing has approximately the shape of a semi-cylinder.

In one embodiment it is provided that the supporting unit includes at least one supporting arm acting on one end wall of the viewing screen unit. In order for the spacing between the viewing screen housing and the furniture walls even in the region of its end walls to be able to be as small as possible, it is also provided according to the invention that the supporting arm or arms respectively grip through an opening located on the back side of the viewing screen housing and act on the inside of the end walls.

In another embodiment example of the invention, it is provided than an opening is provided on the back side of the viewing screen housing which shows at least one but preferably two boundary edges arranged opposite each other and located in the swiveling planes, where each of these two boundary edges arranged opposite each other and located in the swiveling planes, where each of these two boundary edges is supported in an arc-shaped guide arranged on a base support. These guides may respectively take the form of rails receiving the boundary edges or in another embodiment, take that of roller tracks, which consist of a number of pairs of rollers arranged one behind another in an arc-shaped line. The supporting unit described above makes it possible to support the viewing screen housing from its rear side, so that a foot arranged under the viewing screen housing or arms grasping the viewing screen housing from the side may be eliminated. These features according to the invention also contribute to accomodating the viewing screen unit with the smallest possible space requirement for the given screen dimensions.

The principle is already known of accomodating essentially only the picture tube in the swivelable viewing screen housing, while the other components of the unit are accommodated in a separate receiving housing (prospectus of Televideo Systems, Inc.). Here the viewing screen housing is fastened swivelably onto the receiving housing serving as supporting frame. Also, in this known solution, the effective height of the swivelable viewing screen is different depending on the swiveling angle, so that when it is built into the office furniture or the like, the built-in height must be greater than the height of the front face determined by the size of the viewing screen. Besides this, the arrangement of the viewing screen housing on the receiving housing is very poor structurally and not very attractive, since differing gaps form between these two parts depending on the respective swiveling angle.

For such a two-part arrangement is it provided according to the invention that the cylindrically curved back side of the viewing screen housing is received in a concave recess complementary to this in a front side of the receiving housing, so that the two parts together form a complete whole as an essentially closed body. Besides the advantage that the moving part of the whole unit and thus also its supporting and bearing members can be made relatively light, the development according to the invention gives an especially compact and attractive structure. The supporting unit for the swivelable supporting of the viewing screen unit, in a further development of the invention is fastened onto a bottom plate which can be placed in the receiving housing. Basically, the receiving housing can be provided with standing feet, in which case then the bottom plate is placed in the receiving housing as a moving part. However, in a preferred embodiment of the invention, the bottom plate on which all of the components are assembled before the final assembling of the unit is provided with standing feet, wherewith the receiving housing can then be pushed or placed on the bottom plate. The viewing screen housing and the unit housing according to the invention are connected together by means of flexible lines run through the sides of the housings turned toward each other, which lines are not visible in the assembled state of the unit.

In a further development of the invention it is provided that the width and/or height of the receiving housing is the same as or smaller than the width and/or the height of the intersecting plane of the viewing screen housing. Thus, the size of the viewing screen determines the visible cutaway portion which must be kept free for incorporating the unit into a piece of furniture, since the receiving housing arranged behind the viewing screen housing and serving as supporting frame for this does not extend out beyond the width and height of the viewing screen as regards its width and height.

In a further development of the invention, particularly for viewing screen units with a horizontal swiveling axis, it is provided that the axis of gravity of the viewing screen housing which is parallel to the swiveling axis coincides at least approximately with this swiveling axis, so that the viewing screen housing maintains each swiveled position by itself without further means for fixing it in position.

In another development it is provided that the supporting unit for supporting the viewing screen housing includes means for fixing this in position.

A number of embodiment examples of the invention are represented in the drawings and are described in the following drawings.

DETAILED DESCRIPTION OF THE PREFERRED EMBODIMENT

Figure 1:
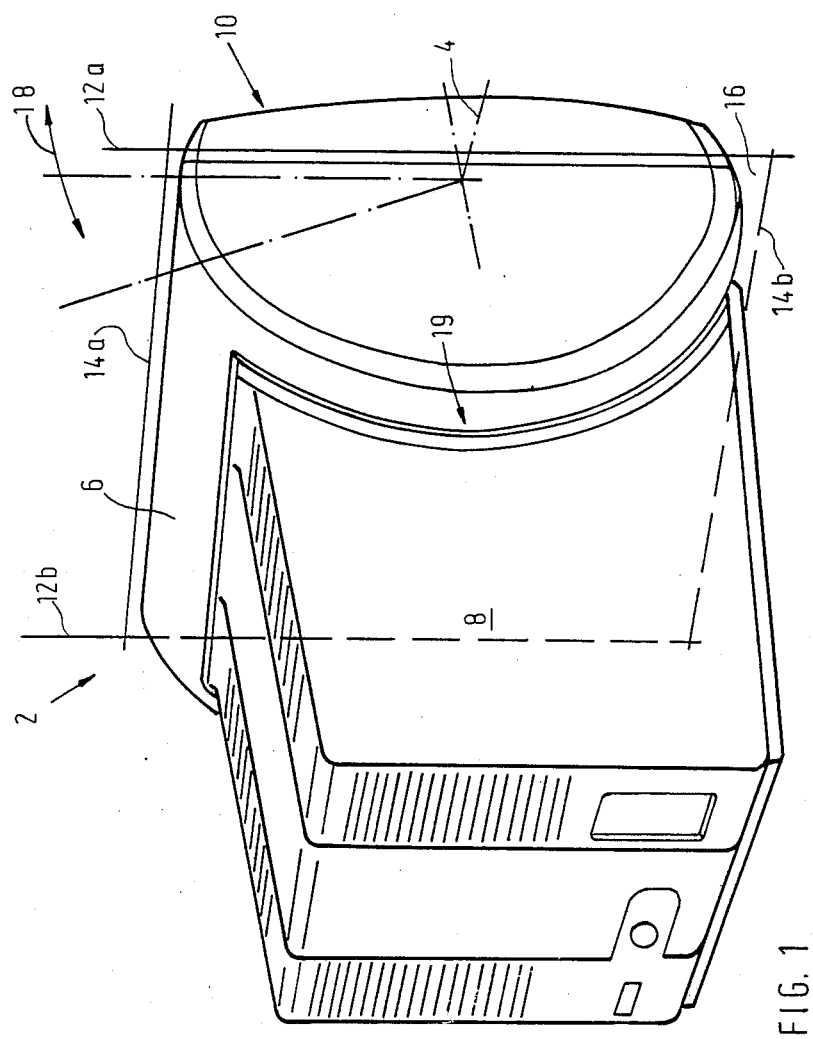
FIG. 1 shows a total view of a viewing screen unit consisting of a viewing screen housing and a receiving housing in a perspective representation.

The viewing screen unit 2 represented in FIG. 1 includes a viewing screen housing 6 swivelable around a horizontal swiveling axis 4, which housing shows approximately the shape of a circular cylinder segment and a receiving housing 8 on which the viewing screen housing 6 is supported swivelably. The receiving housing 8, for example, receives a substantial part of the electrical and electronic components of the whole unit and at the same time serves as a supporting frame for the swivelable supporting of the viewing screen housing 6 which essentially contains only the picture tube. The supporting means for the swivelable supporting of the viewing screen housing 6 are accomodated inside the receiving housing 8, as will be described in detail on the basis of the following figures.

The forward end or display surface 10 of the viewing screen housing 6 formed as a circular cylinder segment is, in the illustrated embodiment, practically filled by the viewing screen proper. However, it is also possible without difficulty to accomodate smaller picture tubes with smaller viewing screen surfaces in the viewing screen housing 6 by use of suitably formed viewing screen masks.

The two lateral boundary lines 12a and 12b as well as the top and bottom boundary lines 14a and 14b respectively designate a front cutaway portion 16 of a piece of furniture receiving the viewing screen unit 2. As can be seen, the viewing screen unit 2 can be placed with a small clearance in a receiving space, narrowly surrounding the viewing screen housing 6, in the piece of furniture, since when the viewing screen housing is swiveled in the direction of the arrow 18 its effective height does not change as a consequence of its circular-cylindrical design. The width and height of the receiving housing 8 should at most be the same as or less than the width and height of the front cutaway portion 16.

The forward-facing open end of the receiving housing 8 exhibits a concave recess 19 complementary to the cylindrical shape of the viewing screen housing which recess fits closely against the cylindrical surface of the viewing screen housing 6. In this manner a very compact space-saving construction of the whole unit is achieved, and one where, in particular, the danger that the swiveling motion of the viewing screen housing 6 will be blocked by parts coming between this and the receiving housing 8 is excluded.

Figure 2:
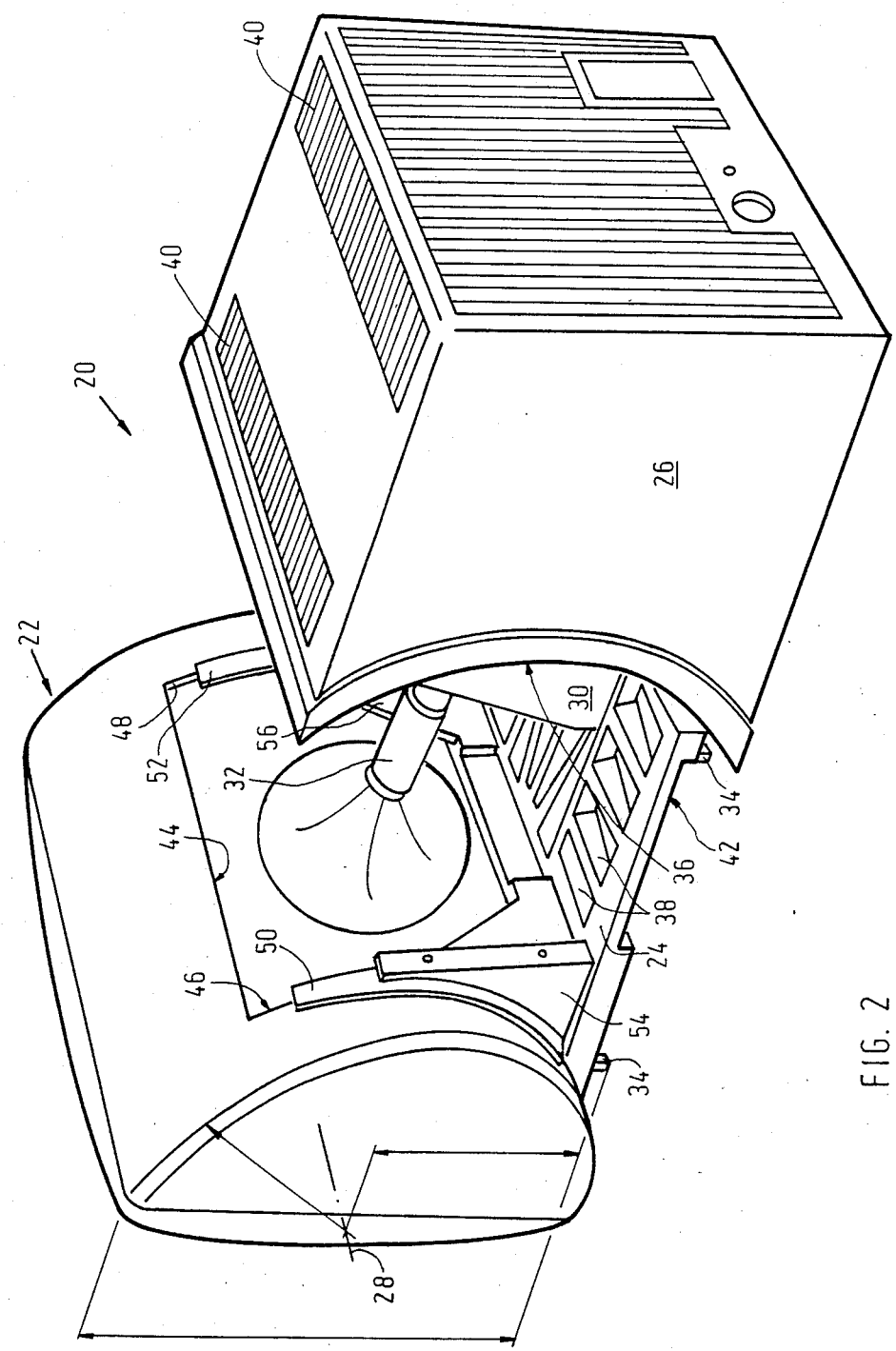
FIG. 2 shows an exploded representation of an arrangement approximately according to FIG. 1.

FIG. 2 shows a viewing screen unit 20 corresponding in structure to the apparatus represented in FIG. 1. It essentially consists of the viewing screen housing 22, the bottom plate 24 and the receiving housing 26. The viewing screen housing 22 is supported swivelably around a horizontal swiveling axis 28 on the bottom plate 24. The viewing screen housing 22 essentially contains only the picture tube. The remaining electrical and electronic components of the unit are mounted on the bottom plate 24, as designated at 30. The electrical connection between the swivelable viewing screen housing and the components 30 is made by way of flexible electric lines. The neck 32 of the picture tube extends out toward the back through the contours of the viewing screen housing. Care must be taken that the region swept by the neck 32 of the picture tube during the swiveling of the viewing screen housing 22 is kept free of components.

After the assembling of the viewing screen housing 22 as well as of the components 30 on the bottom plate 24, then as represented in FIG. 2 the receiving housing 26 can be pushed over or placed on the bottom plate 24 provided with standing feet 34, where the curved back side of the viewing screen housing 22 fits into the recess 36 formed in the receiving housing 26. Another capability is to push the bottom plate 24, equipped with the viewing screen housing 22 and the components 30, into the receiving housing 26 provided with standing feet. The bottom plate 24 is equipped with ventilation slots 38, the receiving housing 26 with ventilation slots 40, which permit cooling air to pass through. The bottom plate 24 also shows a recess 42 on its bottom side which makes possible the entrance of cooling air into the bottom side of the bottom plate 24 even when the standing feet 24 are shown.

A rectangular opening 44 is cut out on the curved back side of the viewing screen housing 22. The respective boundary edges 46,48 situated in the swiveling planes are guided in rails 50,52 curved in an arc shape. The rails 50,52 are fastened to the bottom plate 24 by means of clamping stands 54,56 assigned to them. The supporting described permits a swiveling motion by the semi-cylindrical viewing screen housing 22 around the axis which defines the center of curvature of the cylindrical contour of the viewing unit and thus around the swiveling axis 28. The opening 44 is also required for the passage through of the connecting wiring between the picture tube and the control circuitry in the housing 8 not represented.

Figure 3:
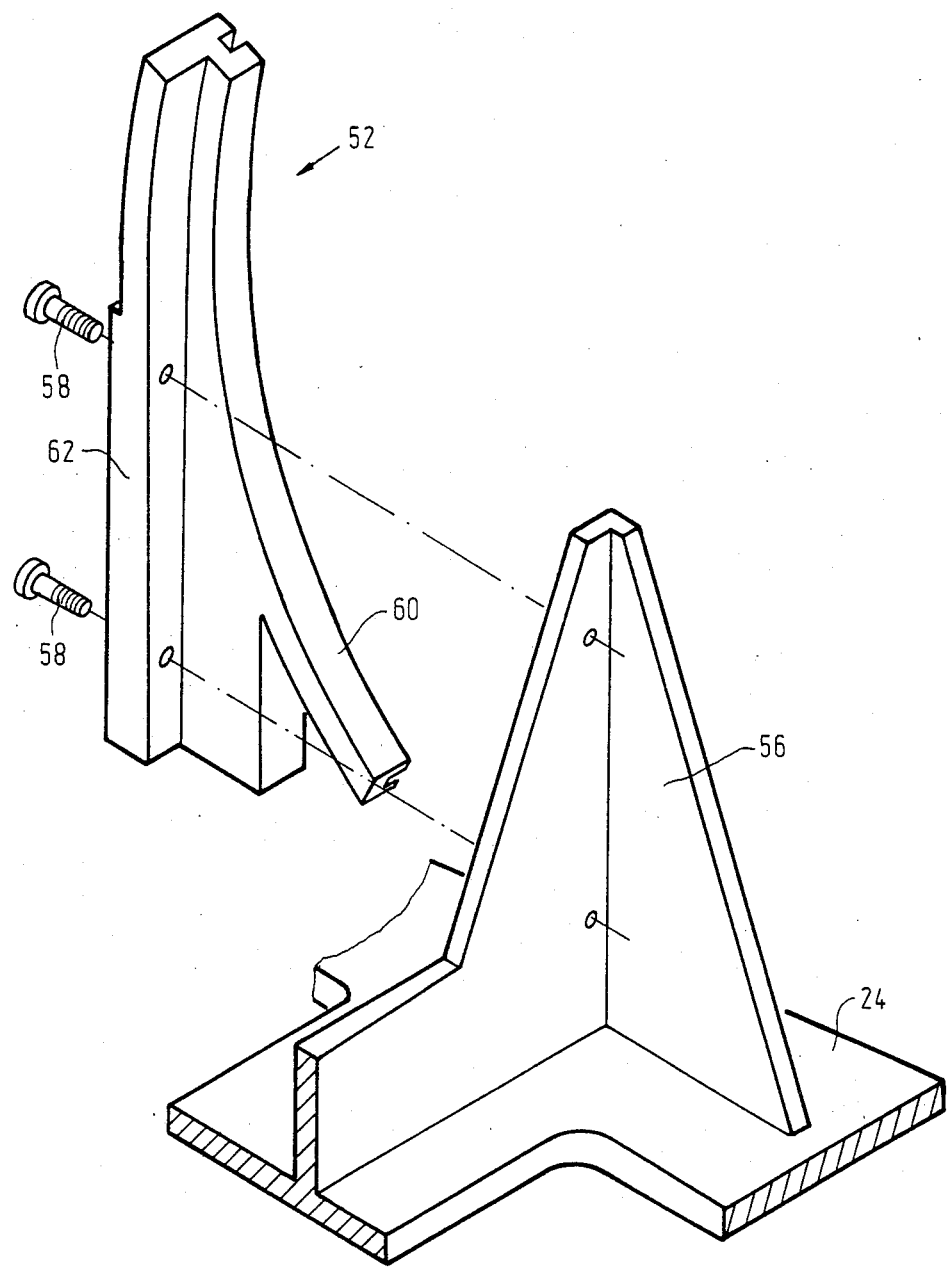
FIG. 3 shows a detail from FIG. 2 in an enlarged representation.

FIG. 3 in an enlarged representation shows a supporting element according to FIG. 2. An angular clamping stand 56 is arranged on the bottom plate 24. An arc-shaped rail 52 can be fastened onto this by means of bolts 58. The rail consists of an arc-shaped channel section 60 as well as a fastening flange 62 joined to this. The assembling of the viewing screen unit according to FIG. 2 is done for example in the following steps: first the rails 50,52 are pushed onto their assigned boundary edges 46,48. Then the viewing screen housing 22 is placed on the bottom plate 24 and the rails 50,52 are bolted to their assigned clamping stands 54,56. After this the picture tube provided with a frame-like viewing screen housing 22, whereby the picture tube neck 32 passes through the opening 44. Then the electrical connections are made between the components arranged on the bottom plate 24. Finally, the receiving housing 26 is pushed over the bottom plate 24 and fastened to the latter.

Figure 4:
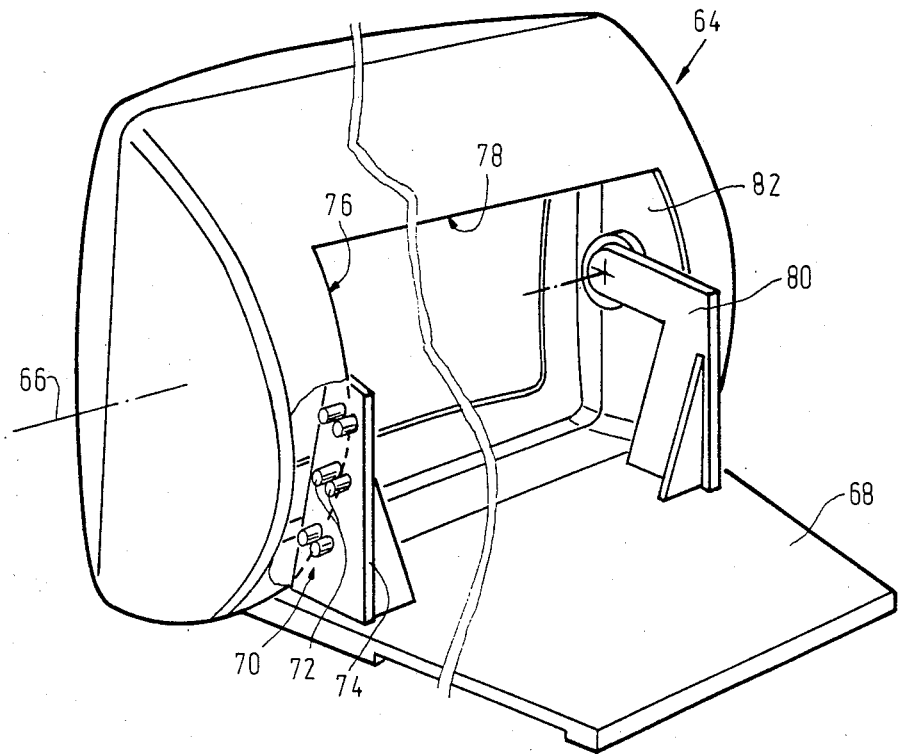
FIG. 4 shows a viewing screen housing approximately according to FIG. 2 with two different supporting units.

FIG. 4 in a simplified representation shows a viewing screen housing 64 which is fastened onto the bottom plate 68 to be swivelable around a swiveling axis 66. The viewing screen housing represented in FIG. 2. In the left part of the figure the supporting unit for the swivelable supporting of the viewing screen housing 64 is formed by a roller track 70 which consists of a plurality of pairs of rollers 72 arranged one behind another on an arc-shaped line. The rollers 72 of a roller track are respectively arranged rotatably on a clamping stand 74 and serve respectively for guiding a boundary edge 76, located in a swiveling plane, of an opening 78 formed on the back side of the viewing screen housing 64.

In the right half of the picture in FIG. 4, the supporting unit for the swivelable supporitng of the viewing screen housing 64 is formed by a supporting arm 80 gripping through the opening 78, which arm acts on the inside of the end wall 82 of the viewing screen housing. In a mannner which need not be represented in detail, the supporting arm 80 is, for example, provided with a pin receiver and the end wall opposite end wall 82 with a pin supported in the pin receiver.

The weight distribution of the fully equipped viewing screen housing is preferably chosen such that the swivel axis corresponds substantially with the center of gravity. This is particularly true for the particularly easy-acting support according to FIG. 4, left half of the figure. In this case, the viewing screen housing 64 remains stationary in any tilted position without any further fixing in position.

In a supporting representation according to FIGS. 2 and 3, an additional means for fixing the viewing screen housing in position can be achieved by having the boundary edges 46,48 of the viewing screen housing 22 held friction-tight by their assigned rails 50,52. The same holds true for the supporting unit according to FIG. 4, right half of figure, in which for example, the pin arranged on the end wall 82 engages friction-tight in the pin receiver arranged on the supporting arm 80.

We claim:
1. An electronic CRT display assembly having a forward direction corresponding to the projection direction of a CRT and a rearward direction which is opposite to the forward direction, said assembly comprising:
 a bottom support plate;
 a pair of standards mounted on said support plate in spaced apart and parallel relationships to extend substantially upwardly at right angles from said plate;
 a viewing screen unit having a relatively flat CRT display screen facing in said forward direction;
 said screen unit having a rearward facing semi-cylindrical periphery which is contoured in a constant radius curve the axis of which lies in a fixed, parallel and laterally extending spaced relationship with the plane of said plate;
 said screen unit being displaceably connected to said standards for rotation about a fixed axis which coincides with the axis of said constant radius curve;
 and a receiving housing having forward facing opposite peripheral edges which are contoured in a constant radius curve corresponding to the constant radius curve of the rearward facing periphery of the viewing screen unit, said receiving housing being secured to said bottom plate with the opposite peripheral edges immediately adjacent the rearward facing periphery of said screen unit, to substantially enclose the rearward facing periphery of said screen unit while permitting unimpeded rotation of said screen unit about said axis of rotation.

2. Apparatus as defined in claim 1 wherein said axis of rotation is substantially horizontal when said bottom plate is substantially horizontal.

3. Apparatus as defined in claim 1 further including feet mounted on the under side of said support plate for supporting said assembly in the assembled condition.

4. Apparatus as defined in claim 1 wherein the center of gravity of said viewing screen unit falls at least substantially on said axis of rotation.

5. Apparatus as defined in claim 1 further including slide means interconnecting said viewing screen unit with said standards to accommodate said displacement.

6. Apparatus as defined in claim 1 further including a set of rollers on at least one of said standards defining a track, a portion of the rearward facing periphery of said viewing screen unit being mounted in said track for rotation of said viewing screen unit relative to said bottom plate.

7. Apparatus as defined in claim 1 further including a pivot pin interconnecting at least one of said standards and an end wall of said viewing screen unit to provide for said rotation.

* * * * *